Patented Oct. 19, 1948

2,451,818

UNITED STATES PATENT OFFICE 2,451,818

VINYLPHENOXTHINES AND METHOD OF PREPARING THE SAME

Ralph G. Flowers and Leola W. Flowers, Pittsfield, Mass., assignors to General Electric Company, a corporation of New York No Drawing. Application May 29, 1947, Serial No. 751,468

6 Claims. (Cl. 260—327)

The present invention relates to vinylphenoxthines, more particularly to monovinylphenoxthine, e. g., 3-vinylphenoxthine, and to a method of preparing the same.

We have discovered that a monovinylphenoxthine, more particularly 3-vinylphenoxthine, which may be represented by the formula

I.

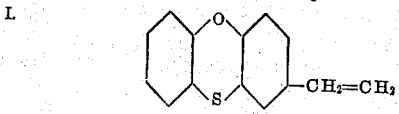

can be prepared by dehydrating an α-hydroxyethylphenoxthine, more specifically 3-α-hydroxyethylphenoxthine, which may be represented by the formula

II.

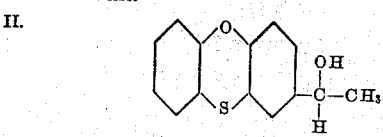

The latter compound can be prepared by hydrogenating 3-acetylphenoxthine under controlled reaction conditions.

Briefly, then, it may be stated that the present invention involves the preparation of a monovinylphenoxthine, specifically 3 - vinylphenoxthine, by acetylating phenoxthine with an acetylating agent, e. g., acetic acid or anhydride, acetyl chloride or bromide, ketene, etc., to obtain 3-acetylphenoxthine, hydrogenating the latter to form 3-α-hydroxyethylphenoxthine, and dehydrating the 3-α-hydroxyethylphenoxthine to obtain 3-vinylphenoxthine.

Phenoxthine readily undergoes a Friedel-Crafts reaction with acetic anhydride and other acetylating agents in the presence of a Friedel-Crafts catalyst, e. g., aluminum chloride, aluminum bromide, ferric chloride, etc. The chief product of the acetylation, as the reaction is generally carried out, is 3-acetylphenoxthine. However, by varying the reaction conditions, e. g., temperature, solvent, catalyst, concentration, etc., mono-substitution may be obtained in other positions in the phenoxthine nucleus. Furthermore, polyacetylphenoxthines, more particularly diacetylphenoxthines, may be readily obtained by subjecting any monoketone isomer to further acetylation, if necessary under more severe conditions. Divinylphenoxthines may be obtained from the diacetylphenoxthines by employing the same method as that used for preparing the monovinylphenoxthines from monoacetylphenoxthines as hereinafter described. Monoketone isomers other than 3-acetylphenoxthine, upon reduction to the corresponding carbinols and subsequent dehydration yield vinyl-substituted phenoxthine derivatives wherein the vinyl group is not in the 3-position, but in the position originally occupied by the acetyl group.

In order to facilitate control of the acetylation reaction we have found it desirable to carry out the reaction in a solvent, e. g., carbon disulfide, nitrobenzene, carbon tetrachloride, or other solvents which, under the conditions of reaction, is inert in a Friedel-Crafts reaction. In general, the catalyst is dissolved or suspended in the solvent, and the mixture of phenoxthine and the acetylating agent is then added to the catalyst solution. The addition of the reactants to the catalyst solution must be carefully controlled in order that the temperature of the reaction mixture can be maintained in the range necessary for producing the desired ketone. The acetylation is preferably carried out at temperatures of from 30° C. to 45° C. After completion of the reaction, the reaction mass is hydrolyzed, and the organic layer is allowed to separate. The following equation illustrates the above described reaction when acetic anhydride is employed as the acetylating agent and aluminum chloride is the Friedel-Crafts catalyst:

III.

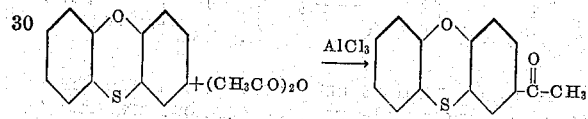

The ketone may be separated from the other products comprising the organic layer, as for example, by distillation.

The next step in the preparation of monovinylphenoxthine is the reduction of the ketone to α-hydroxyethylphenoxthine. The reduction of the ketone is carried out, for example, by hydrogenating the monoacetylphenoxthine in the presence of a hydrogenation catalyst, e. g., finely divided platinum, platinum, platinum oxide, palladium, copper chromite, etc. The hydrogenation is preferably carried out in a solvent medium, such as, for example, methyl alcohol. We have also found it desirable to maintain the hydrogen at super-atmospheric pressure, for example, at pressures of the order of 800 to 3000 pounds per square inch, and preferably at a pressure of about 1500 pounds per square inch. The reaction is carried out at such temperatures and for sufficient time to reduce all the ketone or ketones present in the initial reaction mixture. The reduction of the ketone to the carbinol under the above described conditions may be illustrated briefly by the following equation:

IV.
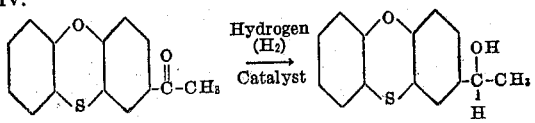

The monovinylphenoxthine is prepared from the α-hydroxyethylphenoxthine by dehydrating the carbinol. This dehydration reaction may be carried out by reacting the carbinol with any of the usual chemical dehydrating agents, such for instance, as potassium acid sulfate, zinc chloride, phosphoric anhydride, etc. However, we have found that in the production of high boiling polynuclear vinyl compounds such as those with which our invention is concerned, a direct vapor-phase catalytic dehydration is the preferred method. This consists in dehydrating the α-hydroxyethylphenoxthine in contact with activated alumina along or with other metallic oxides, e. g., oxides of chromium, tungsten, molybdenum, manganese, etc., more particularly by passing the carbinol over the activated alumina or other vapor-phase dehydration catalyst in a system which is maintained under reduced pressure, e. g., a pressure of 0.1 mm. to 20 mm. mercury. In carrying out this dehydration, the carbinol, dissolved in an inert solvent, e. g., benzene, toluene, etc., is fed at a carefully controlled rate through a vertical reaction column packed with catalyst pellets, which is maintained at temperatures appreciably above the boiling point of the carbinol at the reduced pressure employed, e. g., 340–360° C. In other words, the carbinol is vaporized as soon as it enters the reaction column and is maintained in the vapor phase as long as it is in the presence of the catalyst, or as long as it is at such temperatures that polymerization of the monovinylphenoxthine, or an undesirable condensation of the carbinol, might result. The following equation illustrates the vapor-phase dehydration reaction in which activated alumina is employed as the catalyst:

V.
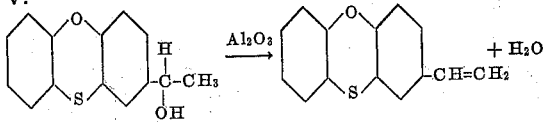

The crude product comprising the monovinylphenoxthine may be used as such, but preferably it is purified by suitable means, as for example by recrystallizing from solution. Alcohol has been found particularly suitable as a solvent for carrying out this recrystallization.

In order that those skilled in the art may better understand how the present invention may be carried into effect, the following examples are given by way of illustration and not by way of limitation. All percentages are by weight.

Example 1

*Preparation of 3-acetylphenoxthine*

One hundred and thirty-five (135) grams of anhydrous aluminum chloride was placed in a 2-liter, 3-neck flask, equipped with a stirrer, separatory funnel, condenser, and thermometer, and 300 cc. of carbon disulfide was added to the aluminum chloride. A mixture of 200 grams of phenoxthine dissolved in 700 cc. of carbon disulfide and 85 grams of acetyl chloride was slowly added through the separatory funnel. This addition required six hours, which was sufficiently slow so that external cooling was unnecessary. The reaction mixture was allowed to stand for about one-half hour after the reactants had been added and the mass was then hydroylzed with ice and hydrochloric acid. A yellow precipitate formed. This precipitate was washed several times with water and was then dried and fractionally distilled. The main fraction, which boiled at 165–185° C. at 1 mm. mercury, was recrystallized from alcohol twice, the resulting purified 3-acetylphenoxthine having a melting point of 111–112° C.

Example 2

*Preparation of 3-α hydroxyethylphenoxthine*

Seventy and one-half (70.5) grams of 3-acetylphenoxthine prepared as described in Example 1 was dissolved in 1000 cc. of absolute methyl alcohol. Five grams of copper chromite was added to the solution as a catalyst. This mixture was placed in a glass-lined high pressure bomb which was then filled with hydrogen to a pressure of about 1500 pounds. The bomb was then heated to about 160° C., and the reaction was carried out while shaking the bomb, for about five hours. A pressure drop of about 140 pounds per square inch within the bomb took place because of the hydrogenation. The reaction mass was removed from the bomb, filtered to remove the catalyst, and then heated on a steam bath to remove the methyl alcohol. The resulting material was recrystallized from 70–90° C. ligroin. Sixty-four (64) grams of 3-α-hydroxyethylphenoxthine in the form of small white needle crystals having a melting point of 65–67° C. was obtained.

Example 3

*Preparation of 3-vinylphenoxthine*

Thirteen (13) grams of 3-α-hydroxyethylphenoxthine, dissolved in 100 cc. of benzene, was allowed to drop through a vertical column packed with alumina pellets and heated to 340–360° C. A pressure of 10–20 mm. of mercury was maintained on this system by means of a vacuum pump. An air-condenser carried the product from the reaction column into an ice-cooled receiver. The resulting 3-vinylphenoxthine was recrystallized from alcohol as white needle crystals melting at 39.5–41° C. An analysis of this new phenoxthine derivative showed the carbon content to be 74.30% and the hydrogen to be 4.69%, which agrees with the theoretical content of 74.33% carbon and 4.47% hydrogen for the 3-vinylphenoxthine.

In general, the polymerization of the monovinylphenoxthine may be inhibited by the same compounds that inhibit the polymerization of styrene, e. g., catechol, hydroquinone, etc. Such inhibitors may be washed out of the dissolved monomer with a dilute alkali solution if desired; or, polymerization may be carried out in the presence of a small amount of inhibitor at an elevated temperature, with or without a polymerization catalyst.

Monovinylphenoxthines are especially suitable for use in the preparation of polymers and copolymers that are useful in various industrial applications, for example in the plastics and coating arts and as dielectric materials in the electrical art. They may also be employed as starting materials in the preparation of other organic compounds. The polymers and copolymers of monovinylphenoxthines and the methods for preparing said polymers and copolymers are described and claimed respectively, in our copending applications Serial No. 751,469, now Patent 2,449,527, and Serial No. 751,470, now Patent 2,449,528.

What we claim as new and desire to secure by Letters Patent of the United States is:

1. 3-vinylphenoxthine.
2. Monovinylphenoxthine.
3. The method of preparing 3-vinylphenoxthine which comprises acetylating phenoxthine to obtain 3-acetylphenoxthine by effecting reaction between phenoxthine and an acetylating agent in the presence of a Friedel-Crafts type catalyst, hydrogenating the 3-acetylphenoxthine to 3-(alpha-hydroxyethyl) phenoxthine, and dehydrating the latter by contacting it with activated alumina thereby to remove a hydrogen atom and a hydrogen group in the form of water from the hydroxyethyl radical to obtain 3-vinylphenoxthine.
4. The method of preparing monovinylphenoxthine which comprises (1) acetylating phenoxthine to obtain mono-acetylphenoxthine by effecting reaction between phenoxthine and an acetylating agent in the presence of a Friedel-Crafts type catalyst, (2) hydrogenating the mono-acetylphenoxthine to mono-(alpha-hydroxyethyl) phenoxthine, and (3) dehydrating the carbinol obtained in (2) by contacting it with a dehydrating agent thereby to remove a hydrogen atom and a hydroxyl group in the form of water from the hydroxyethyl radical to obtain monovinyl phenoxthine.
5. The method of preparing monovinylphenoxthine which comprises (1) acetylating phenoxthine to obtain mono-acetylphenoxthine by effecting reaction between phenoxthine and an acetylating agent in the presence of a Friedel-Crafts type catalyst, (2) hydrogenating the mono-acetylphenoxthine to mono-(alpha-hydroxyethyl) phenoxthine, and (3) dehydrating the carbinol obtained in (2) by contacting it with activated alumina thereby to remove a hydrogen atom and a hydroxyl group in the form of water from the hydroxyethyl radical to obtain monovinylphenoxthine.
6. The method of preparing 3-vinylphenoxthine which comprises (1) acetylating phenoxthine to obtain 3-acetylphenoxthine by effecting reaction between phenoxthine and an acetylating agent in the presence of a Friedel-Crafts type catalyst, (2) hydrogenating the 3-acetylphenoxthine to 3-(alpha-hydroxyethyl) phenoxthine, and (3) dehydrating the carbinol obtained in (2) by contacting it with a dehydrating agent thereby to remove a hydrogen atom and a hydroxyl group in the form of water from the hydroxyethyl radical to obtain 3-vinylphenoxthine.

RALPH G. FLOWERS.
LEOLA W. FLOWERS.

REFERENCES CITED

The following references are of record in the file of this patent:

UNITED STATES PATENTS

| Number | Name | Date |
|---|---|---|
| 2,049,725 | Smith | Aug. 4, 1936 |
| 2,221,820 | Smith et al. | Nov. 19, 1940 |

FOREIGN PATENTS

| Number | Country | Date |
|---|---|---|
| 234,743 | Germany | May 20, 1911 |

OTHER REFERENCES

Deasy: "The Chemistry of Phenoxathin and its Derivatives, Chemical Reviews, 33, 173–193 (1943).